United States Patent [19]

Vasiliev et al.

[11] 4,093,578

[45] June 6, 1978

[54] SELF-LUBRICATING ANTIFRICTION MATERIAL

[76] Inventors: Jury Nikolaevich Vasiliev, ulitsa Vostrukhina 6, korpus 3, kv. 67, Moscow; Andrei Viktorovich Petrenko, Pushkino, Moskovsky prospect, 43, kv. 17, Moskovskaya oblast; Georgy Nikolaevich Bagrov, Mozhaiskoe shosse, 74, kv. 87, Moscow; Galina Nikolaevna Gordeeva, Kosinskaya ulitsa, 18, korpus 2, kv. 56, Moscow; Timur Isaakovich Kazintsev, 3 Dorozhny proezd, 9, kv. 50, Moscow; Vasily Dmitrievich Telegin, Ljubertsy Oktyabrsky prospekt 306, kv. 71, Moskovskaya oblast; Vitaly Naumovich Goldfain, Kuznetsovskaya ulitsa, 10, korpus 3, kv. 39, Leningrad, all of U.S.S.R.

[21] Appl. No.: 662,202

[22] Filed: Feb. 27, 1976

[51] Int. Cl.$^2$ .............................................. C08L 91/00
[52] U.S. Cl. ................................. 260/28 P; 260/28 R; 427/375; 428/225; 428/367; 428/408
[58] Field of Search ............................ 260/28 R, 28 P

[56] References Cited

U.S. PATENT DOCUMENTS

| | | | |
|---|---|---|---|
| 3,702,769 | 11/1972 | Vaughn | 260/28 |
| 3,838,089 | 9/1974 | Pepe | 260/28 |

*Primary Examiner*—Melvyn I. Marquis
*Attorney, Agent, or Firm*—Haseltine, Lake & Waters

[57] ABSTRACT

The present invention proposes a self-lubricating antifriction material. This material comprises carbon filler in the form of a powder of fired oil coke, a powder of artificial graphite or carbon cloth; a binder in the form of epoxy resin having a molecular weight of 300–1560 obtained through condensation of epichlorohydrin with diphenylolpropane, and polyalumophenylsiloxane resin having a molecular weight of 5000–15000 with a ratio of the silicon atoms to the aluminium atoms equal to 3–8; chlorinated paraffin having a molecular weight of 500–1100 and chlorine content of 40–70 mole per cent; the proportion of said components in said self-lubricating antifriction material being as follows: (% by weight):

epoxy resin — 15–57
    polyalumophenylsiloxane resin — 3–10
    chlorinated paraffin — 0.2–10
    carbon filler — the balance The antifriction material can also contain a dry lubricant in the form of powdery boron nitride, natural graphite or molybdenum disulphide in the amount of 5–10% by weight. The above-described self-lubricating antifriction material has a number of valuable properties, namely: good self-lubricating capacity, low friction coefficient, high wearability, high mechanical strength and high thermal resistance. This material can be used for making components of friction units operating without lubricant, as well as for making components of friction units operating in water, kerosene, lubricating oil, liquid oxygen.

2 Claims, No Drawings

SELF-LUBRICATING ANTIFRICTION MATERIAL

The present invention relates to self-lubricating antifriction materials.

Such materials are used for making components of friction units operating without lubricant or for making members of friction units operating in water, kerosene, lubricating oils, liquid oxygen.

Known in the art are self-lubricating antifriction materials comprising a carbon filler in the form of fired oil coke or powdery artificial graphite or one of the abovesaid powdery fillers and carbon fabric, a binder in the form of epoxy and polyalumophenylsiloxane resin, dry lubricant in the form of powdery boron nitride, artificial graphite or molybdenum disulphide. For example, known in the art is a self-lubricating antifriction material containing 67% by weight of powdery fired oil coke, 2.5% by weight of epoxy resin, 1.25% by weight of polyalumophenylsiloxane resin, 21.25% by weight of polymethylphenylsiloxane resin, and 8% by weight of molybdenum disulphide.

Also known in the art is a number of other self-lubricating antifriction materials. For example, an antifriction material is known containing 56% by weight of phenolformaldehyde resin, 4.4% by weight of powdery natural graphite, 19% by weight of powdery lead, 19% by weight of powdery copper, and 1.6% by weight of silicone resin.

Also known in the art is an antifriction material containing 35.5% by weight of epoxy resin, 54% by weight of molibdenum disulphide, 10.3% by weight of solidifier of the epoxy resin (agent 901) and 0.2% by weight of stearine ester.

In addition, known in the art is an antifriction material which consists of thermally treated cord cloth impregnated with a mixture of phenolformaldehyde resin and graphite.

The known self-lubricating antifriction materials have no adequate mechanical strength. When used in friction units operating under high specific loads, these materials are characterized by comparatively low wear resistance due to the face that the temperature of the sliding surfaces rises up to 200°–300° C; under these conditions the life of the above-mentioned materials is reduced (sliding friction coefficient and wearability are drastically increased).

Also known in the art is a self-lubricating antifriction material consisting of a carbon filler in the form of a powder of fired oil coke or a powder of artificial graphite or one of said powdery fillers and carbon fabric; a filler in the form of epoxy resin with molecular weight of 300–1560 obtained through condensation of epychlorohydrin with diphenylolpropane and polyalumophenylsiloxane resin having a molecular weight of 5000–15000 with a ratio of the silicon atoms to the aluminium atoms equal to 3–8; a dry lubricant in the form of powdery boron nitride, powdery natural nitride or powdery molybdenum disulphide. In this case, if the antifriction material contains powdery carbon filler, this material consists of 60–85% by weight of carbon filler, 17–22% by weight of epoxy resin, 1–3% by weight of polyalumophenylsiloxane resin, and 3–10% by weight of dry lubricant. When the antifriction material contains powdery carbon filler with carbon fabric as a carbon filler, this material consists of 1.5–20% by weight of powdery carbon filler, 20–60% by weight of carbon cloth, 17–40% by weight of epoxy resin, 3–8% by weight of polyalumophenylsiloxane resin, and 5–12% by weight of dry lubricant.

This self-lubricating antifriction material has high mechanical strength. However, when used in friction units under high specific loads and elevated temperatures, this material has relatively low resistance to wear.

An object of the present invention is to provide a self-lubricating antifriction material which has good resistance to wear and high mechanical strength.

In accordance with this and other objects the invention provides a self-lubricating antifriction material containing a carbon filler in the form of fired powdery oil coke, powdery artificial graphite of carbon fabric; a binder in the form of epoxy resin having a molecular weight of 300–1560 obtained by condensation of epichlorohydrin with diphenylolpropane and polyalumophenylsiloxane resin, having a molecular weight of 5000–15000 with the ratio of the silicon atoms to the aluminium atoms equal to 3 to 8; chlorinated paraffin having a molecular weight of 500–1100 and a content of chlorine of 40–70 mol. percent; the ratio of said components in the proposed self-lubricating antifriction material is as follows (% by weight):

epoxy resin — 15–57
polyalumophenylsiloxane resin — 3–10
chlorinated paraffin — 0.2–10
carbon filler — the balance Owing to the face that the proposed self-lubricating antifriction material contains chlorinated paraffin, this material has a low friction coefficient and high resistance to wear under specific loads. Furthermore, the proposed antifriction material is characterized by high mechanical strength typical for epoxy plastics and high thermal resistance typical for plastics based on silicon organic resins. The proposed material is also characterized by high hardness and low gas permeability. These qualities allow the proposed self-lubricating antifriction material to be used for making piston rings of compressors operating without lubricant under positive pressures exceeding 100 atm, and for end seals operating "kerosene-air", "water-air", or "liquid oxygen-air" media rotating at a sliding speed of 7 to 20 m/sec. This material can also be used for making plates of rotary pumps, sliding bearings and thrust bearings subjected to specific friction loads of up to 100 kgf/cm$^2$.

The proposed material can be used during a long time period (exceeding 1000 hours) at an ambient temperature of from (−200°) to (+200)° C and during a short period (less than 100 hours) at a temperature of from 200° to 300° C. The permissible specific loads and sliding speeds are stipulated by the operating conditions in each specific case: heat withdrawal from the sliding surface, external conditions, ambient temperatures, etc.

When the self-lubricating antifriction material contains powdery filler as a carbon filler, the friction coefficient can be reduced to a greater extent if said material includes dry lubricant such as powdery boron nitride, powdery natural graphite or molybdenum disulphide in the amount of 5 to 10% by weight.

As stated above, the proposed self-lubricating antifriction material includes epoxy resin having a molecular weight of 300–1560. The said resin having a molecular weight of 300–600 is obtained by a conventional method through condensation of 2–5 moles of epichlorohydrin and 1 mole of diphenylolpropane in an alkaline medium at a temperature of 60°–100° C according to the following scheme:

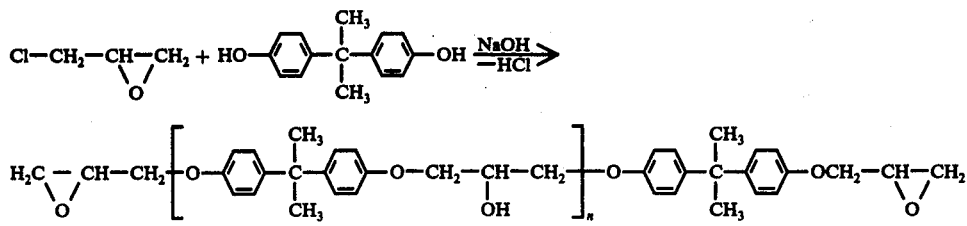

where $n = 2$ to 5.

After the condensation during 2 to 3 hours the solvent and unreacted products are distilled off at a temperature of up to 130° C.

The epoxy resin having a molecular weight of from > 600 to 1560 is obtained by condensation of epoxy resin having a molecular weight of 300–600 with additional quantities of diphenylolpropane or by condensation of diphenylolpropane with epichlogohydrin in an alkaline medium at a temperature of 120°–130° C. In the process of synthesis of epoxy resin having a molecular weight of from > 600 to 1560 the molar ratio of the diphenylolpropane with epichlorohydrin is equal to 4–6:5–7 respectively. After the water and solvent (toluene) have been distilled off at a temperature of 110°–130° C, a yellow viscous resin in obtained.

The resins produced according to the proposed method are wetted with water to remove alkali and sodium chloride to a pH value of 6.5–7.5 and a content of chlorine ions not higher than 0.2%.

As mentioned above, the proposed self-lubricating antifriction material includes polyalumophenylsiloxane resin having a molecular weight of 5000–15000 and featuring cyclolinear structure with phenyl groups at the silicon atoms and aluminium atoms in the main chain of the macromolecule. The structural formula of the resin is as follows

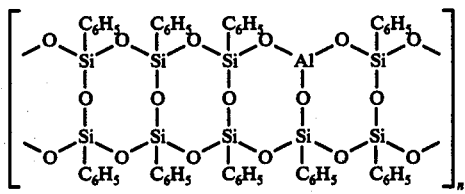

where $n = 2$ to 5, the ratio (Si/Al) = 3 to 8.

Polyalumophenylsiloxane resin of such a structure is also obtained by known methods, namely by exchange decomposition of sodium salts of phenylsilanetriols with chlorous aluminium (i.e., aluminum chloride) or sulphuric aluminium (i.e., aluminum sulfate) or by joint hydrolysis of phenyltrichlorosilane and chlorous aluminium or sulphuric aluminium in an alkaline medium. In this case toulene or butanol may be used as an organic solvent. By prescribing the ratio of siliconorganic monomer and aluminium salt, polyalumophenylsiloxane having a various Si/Al ratio is obtained.

Polyalumophenylsiloxane resin of a cyclolinear structure is characterized by high thermal stability, since, in order to disintegrate its molecule, it is necessary to break three bonds Si-O-Si or two bonds Si-O-Si and one bond Si-O-Al, or one bond Si-O-Si and two bonds Si-O-Al. High energy of the bonds Si-O-Si and Si-O-Al comprising 86 and 140 kcal/mol, respectively, as well as the necessity in simultaneous breakage of three strong chemical bonds sharply reduce the rate of thermal destruction of the antifriction material, containing polyalumophenylsiloxane resin, at high temperatures.

The aluminium in the main chain of the macromolecule is characterized by coordinate-active action for electrophilic atoms of oxygen. This creates an additional system of internal bonds in the binder, thus reducing the liability of the antifriction material to mechanical deformations at a high temperature on the contacting projections on the sliding surfaces.

As mentioned above, the composition of the proposed antifriction material includes carbon fillers produced by the known methods of carbonization and graphitization. These methods are based on heat treatment of such products as oil coke, viscose fabric at a temperature of from 700° to 2400° C in a reducing (CO, hydrocarbons) or neutral (nitrogen) gas medium.

After heat treatment at a temperature of 700°–1100° C said products contain 70–90% by weight of carbon, 0.5–2.0% by weight of hydrogen, 0.2–2.5% by weight of oxygen and 8–25% by weight of inorganic admixtures. The heat treatment at a temperature of 1200°–1600° C contributes to removal of almost all impurities in the carbon material. After this treatment the material consists of 95–99% by weight of carbon and not higher than 1–5% by weight of inorganic impurities. The heat treatment at a temperature of 1600°–2400° C results in formation of crystalline graphite structure of carbon. After the heat treatment at this temperature (700°–2400° C) the graphite filler aqcuires a self-lubricating property, and this results in considerable reduction of the sliding friction coefficient and increase in the wear resistance of the antifriction materials.

The process of heat treatment of the powdery oil coke is effected in roasting and graphitizing periodic-cycle furnaces. The powder is charged into graphite crucibles. The heat treatment of the fabric material is effected in shaft continuous-action furnaces or in graphire furnaces by charging the cloth into graphite crucibles.

The proposed self-lubricating antifriction material is prepared as follows.

Carbon filler in the form of fired oil coke or artificial graphite ground to granulometric composition, in which up to 90% of the material is in powdery state passes through a screen 170 meshes, in which case not more than 1.5% remains on a screen 100 meshes and is placed into a mixer with Z-shaped vanes. Then the carbon filler is mixed with dry lubricant, (if necessary) epoxy pre-mixed with chlorinated paraffin resin and a solution of polyalumophenylsiloxane resin, e.g. in toluene. After the mass has been stirred, it is dried in a vacuum cabinet drier or directly in the mixer if the latter is equipped with a heater.

The resulting moulding mass is ground in jaw and vibratory mills and is sieved through a screen 32–48 meshes. The moulding powder obtained is suitable for pressing.

When the antifriction material comprises carbon fabric as a filler, this material is prepared as follows.

An impregnating compound is prepared by mixing epoxy resin with chlorinated paraffin and a solution of polyalumophenylsiloxane resin in toluene or acetone. Then the carbon fabric is impregnated either mechanically or manually. In the former case conventional impregnating machines are employed. In so doing the fabric is passed through the impregnating mixture by a tape transport machines. The impregnated fabric is then fed through a shaft drier at the outlet of which a material to be pressed in obtained.

The impregnated and dried fabric is cut into blanks by the size equal to the cross section of the press mould. The fabric can also be cut into narrow (5–10 mm wide) and long (2–5 m) strips or in the form of pieces of various shapes (square, parallepiped) sized 10–20 × 10–40 mm. Furthermore, the impregnated and dried fabric can be wound on metal rods as a sheet with a width of up to 600 mm.

The moulding material in the form of moulding powder or sheets of impregnated and dried fabric is used for compression pressing to obtain blanks or components of friction units of machines and mechanisms. For this purpose, the material is loaded into a press mould at a temperature of 20°–70° C. The press mould is closed and a pressure of 200 to 650 kgf/cm$^2$ is applied. Then the press mould is heated to a temperature of 200°–205° C under constant pressure during 60–120 minutes depending on the size of the press mould and the input power of the heater. At a temperature of 200°–205° C the blank is kept under pressure during 2–3 minutes per millimeter of the article thickness. After the pressed blank or article is cooled together with the press mould to a temperature of 80°–100° C; then the ready article is withdrawn from the press mould. In order to accelerate the process of cooling, the press mould is equipped with a water heat exchanger. The press mould temperature is measured in the body of the press mould at a level of half the height of the blank or component.

Fine-shape components can be made from moulding powder also by the method of moulding thermosetting plastic materials under pressure. In this case the moulding temperature is equal to 210°–215° C and the pressure inside the mould is equal to 200–400 kgf/cm$^2$. The component is kept in the mould for 5–30 minutes. The mass temperature in the worm mechanism and in the inlet gate must not exceed 100°–110° C. Before discharging the component from the mould, the component temperature is reduced to 80°–100° C by cooling the mould with water.

The invention will be better understood from the following examples of preparing the proposed self-lubricating antifriction material.

EXAMPLE 1

Charged into a vane mixer having a capacity of 100 l was 37 kg of oil coke pre-fired at a temperature of 1300°–1350° C and having granulometric composition, in which 78% of the powder passes through a screen 170 meshes and the remainder passing through a screen 100 meshes is equal to 1.1%. The same mixer is also charged with 2.4 kg of boron nitride. The powdery mixture was stirred during 10 minutes. Then the mixer was charged with 7.2 kg of epoxy resin having a molecular weight of 380 preliminarily mixed with 0.1 kg of chlorinated paraffin having a molecular weight of 500 and chlorine content of 40 mole percent, and 1.4 kg of polyalumophenylsiloxane resin having a molecular weight of 12,000 (the latter was charged in the form of 45% solution in toluene).

The above-mentioned epoxy resin was obtained in toluene medium by means of condensation of 2 moles of epichlorohydrin and 1 mole of diphenylolpropane in the presence of two-fold excess of 50% aqueous solution of sodium hydrate with respect to the evolving hydrochloride. The condensation temperature was equal to 60° C, the time — 2 hours. After the process has been completed, the solvent (toluene and water) was distilled off at a temperature of up to 130° C. The resin was washed off by water from the alkali and sodium chloride. The content of chlorine-ion in the final product was less than 0.1% by weight, pH = 7.1. The content of epoxy groups was 22% by weight, an average molecular weight determined cryoscopically was equal to 380.

The above-mentioned polyalumophenylsiloxane resin was obtained by means of replacement reaction of sodium salt of phenylsilanetriol with aluminium sulphate in toluene and water. The initial ratio of the atoms of Si to Al is equal to 8. This made it possible to obtain the ratio of Si/Al in polyalumophenylsiloxane equal to 6.2. The sulphate-ion was washed with water from the polyalumophenylsiloxane resin dissolved in toluene to obtain content of same less than 0.1% by weight; thereafter the toluene was distilled off to obtain 45% solution of resin. The molecular weight of the resin determined cryoscopically was equal to 12,000.

The precomposed mass (fired oil coke, boron nitride, chlorinated paraffin, epoxy resin and polyalumophenylsiloxane resin) was stirred during 40 minutes. During this time the mass temperature was increased from 20° to 110° C by means of an electric heater. After this temperature has been obtained, the heating and mixing were ceased. The press mass was unloaded and charged into paper bags. After grinding in a jaw mill (one pass through the jaws) and a vibration mill (40 minutes of grinding), the moulding powder was sieved through a screen 48 meshes and was pressed in a press mould into blanks 265 mm in diameter and 230 mm in height. The pressing temperature was equal to 200°–205° C, the pressure of 600–650 kgf/cm$^2$, the time of keeping the blank under pressure at the above temperature was equal to 10 hours. After cooling the press mould to 80° C, the pressed blank was withdrawn.

In order to determine the compression strength of the obtained material, the latter was used for making cylinders 10 mm in diameter and 20 mm high. The volume weight and Brinell hardness were determined on specimens sized 15 × 15 × 100 mm.

The wearability and the friction coefficient were determined on specimens sized 10 × 10 × 10 mm by sliding the specimens over a steel roller of nickel-chrome steel containing 1% by weight of carbon, 18% by weight of chrome, 9% by weight of nickel. The hardness of the HRC steel is 40–50 kgf/mm$^2$ the height of the surface projections is equal to 2 to 4 microns. The sliding speed of the friction surfaces was equal to 0.5 m/sec, the specific load was equal to 70 kgf/cm$^2$. The wearability was determined as the ratio of the decrease in the specimen height to the test duration and was expressed in m/hour.

The properties of the self-lubricating antifriction material produced according to the above Example are as follows.

Density, g/cm$^3$ — 1.76 ± 0.02
Compression strength, kgf/cm$^2$ — 2150 ± 100

Brinell hardness, kgf/mm² — 65 ± 5
Wearability m/hour — 1.9 ± 0.2
Friction coefficient — 0.04 ± 0.01

EXAMPLE 2

Charged into a blade-paddle mixer having a capacity of 100 l was 35 kg of artificial graphite, obtained by heat treatment of oil coke at a temperature of 2200° C, and 5.5 kg of natural graphite. The powders were stirred during 20 minutes. Then the mixer was charged with 10.3 kg of epoxy resin with a molecular weight of 380 preliminarily mixed with 0.5 kg of chlorinated paraffin having a molecular weight of 1100 and chlorine content of 70 mole percent, as well as 2.7 kg of polyalumophenylsiloxane resin having a molecular weight of 7000 (the latter was charged in the form of 55% solution in toluene).

The said epoxy resin was obtained similarly to Example 1.

Polyalumophenylsiloxane resin is obtained as described in Example 1, at initial ratio of the atoms Si/Al equal to 5. In the resin obtained the ratio Si/Al atoms was equal to 3.5. The molecular weight of the resin determined cryoscopically is equal to 7000.

The mass prepared of artificial and natural graphite, chlorinated paraffin, epoxy and polyalumophenylsiloxane resins was dried, crushed and ground as described in Example 1. The obtained moulding material was used for pressing blanks sized 400 ± 100 ± 150 mm under a pressure of 400 kgf/cm² and a temperature of 210°–215° C during 2 hours.

The produced self-lubricating antifriction material was tested similarly to Example 1. The following results were obtained.
Density, g/cm³ — 1.80 ± 0.02
Compression strength, kgf/cm² — 1200 ± 50
Brinell hardness, kgf/mm² — 50 ± 5
Wearability m/hour — 2.5 ± 0.5
Friction coefficient — 0.05 ± 0.01

EXAMPLE 3

Charged into a blade-paddle mixer having a capacity of 10 l was charged with 3.55 kg of fired oil coke obtained as described in Example 1 and of the same granulometric composition, 0.35 kg of molybdenum disulphide, 0.85 kg of epoxy resin with a molecular weight of 450 preliminarily mixed with 0.1 kg of chlorinated paraffin having a molecular weight of 750 and chlorine content of 60 mole percent, and 0.25 kg of polyalumophenylsiloxane resin in the form of 50% toluene solution.

The epoxy resin was obtained by means of condensation of 3 moles of epichlorohydrin and 1 mole of diphenylolprorane. The conditions of condensation and purification of the resin are similar to those of Example 1. The resin contained less than 0.2% by weight of chlorine ions, 18% by weight of epoxy groups and had a molecular weight found cryoscopically equal to 450.

The polyalumophenylsiloxane resin was produced as described in Example 1 at an initial ratio of Si/Al equal to 6. In the produced resin the ratio of the atoms Si/Al was equal to 4.5. The molecular weight of the resin determined cryoscopically is equal to 12,000.

The mass prepared of fired oil coke, molybdenum disulphide, chlorinated paraffin, epoxy resin and polyalumophenylsiloxane resins was mixed at room temperature during 30 minutes and then dried in a vacuum chamber on a pan at a temperature of 110°–120° C and residual pressure of 200 mm Hg during 60 minutes. Then the mass was crushed and ground as described in Example 1 and after that was pressed into blanks 78 mm in diameter and 100 mm high. The pressure was equal to 600–650 kgf/cm², temperature was equal to 200°–205° C, the pressing time was 5 to 5.5 hours.

The produced self-subricating antifriction material was tested similarly to Example 1. The following results were obtained.
Density, g/cm³ — 1.78 ± 0.02
Compression strength, kgf/cm² — 1900 ± 100
Brinell hardness, kgf/mm² — 60 ± 3
Wearability, m/hour — 2.2 ± 0.2
Friction coefficient, — 0.05 ± 0.01

EXAMPLE 4

Charged into a mixer was 7.2 kg of fired oil coke obtained according to Example 1, 0.5 kg of boron nitride, 1.9 kg of epoxy resin with a molecular weight of 450 preliminarily mixed with 0.1 kg of chlorinated paraffin with molecular weight of 1100 and chlorine content of 70 mole percent and 0.5 kg of polyalumophenylsiloxane resin in the form of 60% solution in toluene.

The above-said epoxy resin was obtained similarly to Example 3.

The polyalumophenylsiloxane resin was obtained as described in Example 1 with initial ratio of the atoms Si/Al equal to 5. In the obtained resin the ratio of the atoms Si/Al was equal to 4. The molecular weight of the resin determined cryoscopically is equal to 12,000.

The previously prepared mixture consisting of fired oil coke, boron nitride, chlorinated paraffin, epoxy resin, and polyalumophenylsiloxane resin was mixed under vacuum (residual pressure of 300 mm Hg) at a temperature of 130° C during 90 minutes. Then the mass was crushed, ground and sieved as described in Example 1. The obtained moulding powder was pressed into blanks 78 mm in diameter and 100 mm high. The operating pressure was equal to 600–650 kgf/cm², the temperature was equal to 200°–205° C, the pressing time was equal to 5–5.5 hours.

The produced self-lubricating antifriction material was tested as described in Example 1. The following results were obtained.
Density, g/cm³ — 1.79 ± 0.01
Compression strength, kgf/cm² — 1800 ± 100
Brinell hardness, kgf/mm² — 58 ± 5
Wearability, mu/hour — 1.8 ± 0.2
Friction coefficient — 0.04 ± 0.01

EXAMPLE 5

Charged into a blade-paddle mixer having a capacity of 10 l was 4.5 kg of artificial graphite obtained as described in Example 2 and of the same granulometric composition, 1.6 kg of epoxy resin with a molecular weight of 1560 preliminarily mixed with 0.7 kg of chlorinated paraffin having a molecular weight of 1100 and chlorine content of 70 mole percent, and 0.35 kg of polyalumophenylsiloxane in the form of 55% solution in toluene.

This epoxy resin was obtained by means of condensation of the epoxy resin obtained according to Example 1 with diphenylolpropane taken in such an amount that the mole ratio of epichlorohydrin with diphenylolpropane is equal to 7:6. The condensation temperature was equal to 130°–140° C, the time was equal to 2 hours. As a final result, yellow-brown resin was obtained, which is solid at room temperature and contains 8% by weight and molecular weight determined cryoscopically equal to 1560.

The polyalumophenylsiloxane resin was obtained as described in Example 1 with an initial ratio of the atoms Si/Al equal to 8. In the obtained resin the ratio of the atoms Si/Al was equal to 7. The molecular weight determined cryoscopically was equal to 15,000.

The mass prepared from artificial graphite, chlorinated paraffin, epoxy resin and polyalumophenylsiloxane resin was dried, crushed and ground, as described in Example 1. The obtained moulding powder was pressed into blanks 78 mm in diameter and 100 mm high. The process pressure was equal to 500-600 kgf/cm$^2$, the temperature was equal to 210°-215° C the pressing time was 1.5 hour.

The self-lubricating antifriction material was tested as described in Example 1. The following results were obtained.

Density, g/cm$^3$ — 1.81 ± 0.01
Compression strength, kgf/cm$^2$ — 1000 ± 100
Brinell hardness, kgf/mm$^2$ — 40 ± 5
Wearability, mu/hour — 3.5 ± 0.2
Friction coefficient — 0.06 ± 0.01

EXAMPLE 6

The moulding powder was prepared similarly to Example 1 but it was dried at a temperature of 90° C. Then moulding powder was worked into articles in the form of rings (the outer diameter of 45 mm, the inner diameter of 36 mm and the height of 5 mm) by the method of press moulding used for processing thermosetting plastics. The moulding mass temperature was 100° C, the mould temperature was 215° C, the moulding pressure was 250 kgf/cm$^2$, the time of occurence of the member in the mould was 30 minutes.

The density of the produced self-lubricating antifriction material was determined by hydrostatically weighing a ring made of this material and having the above dimensions; the compression strength was determined on specimens sized 5 × 5 × 5 mm; the wearability and friction coefficient were determined as described in Example 1 but on specimens sized 5 × 5 × 5 mm. The results of these tests are as follows.

Density, g/cm$^3$ — 1.76 ± 0.02
Compression strength, kgf/cm$^2$ — 2000 ± 100
Wearability, mu/hour — 2.0 ± 0.2
Friction coefficient — 0.05 ± 0.01

EXAMPLE 7

A mixer having a capacity of 25 l was used for preparing an impregnating solution. For this purpose the mixer was charged with 10 kg of epoxy resin having a molecular weight of 450 obtained as described in Example 3 and preliminarily mixed with chlorinated paraffin having a molecular weight of 1100 and chlorine content of 70 mole percent, and 2 kg of polyalumophenylsiloxane resin (molecular weight of 5000, the ratio of the atoms Si/Al = 6.2) in the form of 45% solution in toluene obtained similarly to Example 1. 15 kg of acetone was added to the prepared mixture and stirred at room temperature during 30 minutes giving an impregnating solution. Then carbon fabric was impregnated with this solution. The carbon fabric was preliminarily obtained by treating viscose fabric in methane at a temperature of 1200°-1250° C.

Carbon fabric in the form of a strip 600 mm wide was impregnated by passing the fabric through the impregnating mixture so that at least 1200 mm of the fabric was in the impregnating mixture at a time. The rate of transport of the fabric through the mixture was equal to 2.5 m/hour. The imoregnated fabric was dried in a shaft drier at a temperature of 110° C during 40 minutes. The carbon fabric gained weight per pass through the impregnating mixture by 80% as measured after drying this fabric.

The material obtained was used for cutting sheet blanks sized 400 × 1000 mm, which were then laid in a pack 16 mm high. The pack was pressed in a press mould under pressure of 10 kgf/cm$^2$ at a temperature of 200°-205° C during 2 hours. After that the press mould with the blank was cooled down to a temperature of 80° C and the blank was removed form the press mould.

This blank was used for producing specimens sized 15 × 6 × 120 mm required for determining the bending strength and density of the material. The bending strength was found by applying a stress normal to the layers of the carbon fabric. The wearability and friction coefficient were determined along the layers of the specimens sized 10 × 10 × 6 mm.

The tests revealed the following characteristics of the self-lubricating antifriction material.

Density, g/cm$^3$ — 1.22 ± 0.1
Bending strength, kgf/cm$^2$ — 1900 ± 200
Wearability, mu/hour — 3.5 ± 0.5
Friction coefficient — 0.06 ± 0.02

EXAMPLE 8

An impregnating mixture was prepared by charging the mixer with 10 kg of epoxy resin having a molecular weight of 450, produced according to Example 3, and preliminarily mixed with chlorinated paraffin having a molecular weight of 1100 and chlorine content of 70 mole percent, 1 kg of polyalumophenylsiloxane resin in the form of 45% solution in toluene and 10 kg of acetone.

The above polyalumophenylsiloxane resin was obtained as described in Example 1 with the initial ratio of the atoms Si/Al equal to 9. In the obtained resin the ratio of the atoms Si/Al was equal to 8. The molecular weight of the resin determined cryoscopically is equal to 12,000.

The prepared impregnating solution was stirred at room temperature during 30 minutes and then the carbon fabric impregnated with this solution. The carbon fabric was obtained through heat treatment of viscose fabric in methane at 2400° C.

The conditions of transport of carbon fabric through the impregnating solution as well as the conditions of drying the impregnated fabric are similar to those described in Example 7. The fabric doubles its dry weight per pass through the impregnating mixture.

The thus obtained material was used for cutting sheet blanks sized 400 × 100 mm and laid as a pack 100 mm high. The pack was pressed in a press mould with a cross section of 400 × 100 mm under pressure of 200 kgf/cm$^2$ at a temperature of 200°-205° C during 10 hours. Then the press mould with the blank was cooled down to a temperature of 80° C, and the blank was removed from the press mould. Specimens sized 10 × 10 × 10 mm were used for determining the wearability and friction coefficient along the fabric layers. The specific impact strength was measured on specimens sized 15 × 15 × 100 mm.

The tests revealed the following characteristics of the self-lubricating antifriction material.

Density, g/cm$^3$ — 1.23 ± 0.1

Bending strength, kgf/cm² — 1900 ± 200
Specific impact strength, kgf.cm/cm² — 35 ± 4
Wearability, mu/hour — 3.5 ± 0.4
Friction coefficient — 0.04 ± 0.02

EXAMPLE 9

An impregnating solution was prepared by charging the mixer with 10 kg of epoxy resin having a molecular weight of 450 obtained according to Example 3 and preliminarily mixed with 0.2 kg of chlorinated paraffin with a molecular weight of 1100 and chlorine content of 70 mole percent, 0.52 kg of polyalumophenylsiloxane resin in the form of 63% solution in toluene obtained according to Example 1, and 7 kg of acetone.

The prepared impregnating solution was stirred at room temperature during 40–45 minutes, then carbon fabric was impregnated with this solution. The carbon cloth was obtained by means of heat treatment of viscouse cloth at a temperature of 800° C. The cloth was transported through the impregnating solution and dried as described in Example 7. The carbon fabric weight increased by 120% per pass through the impregnating solution.

The dried carbon fabric was cut into sheets sized 400 × 100 mm which then were assembled in a pack 100 mm high and were pressed in a press mould with a cross section of 400 × 100 mm. The pressing process was effected under a pressure of 200 ± 20 kgf/cm², a temperature of 200°–205° C during 10 hours.

The pressed sheets were used for making specimens sized 15 × 15 × 120 for determining the bending strength (the stress was applied normal to the layers of the carbon fabric). The identical specimens were used for determining the Brinell hardness, density and impact strength. Specimens sized 10 × 10 × 10 mm were also made for studying the wearability and friction coefficient according to the technique described in Example 1.

The tests revealed the following characteristics of the self-lubricating antifriction material.

Density, g/cm³ — 1.25 ± 0.2
Brinell hardness, kgf/mm² — 40 ± 5
Bending strength, kgf/cm² — 1600 ± 150
Specific impact strength, kgf.cm/cm² — 25 ± 5
Friction coefficient — 0.06 ± 0.01
Wearability, mu/hour — 3.9 ± 0.3

We claim:

1. A self-lubricating antifriction material comprising a carbon filler selected from the group consisting of a powder of fired oil coke, a powder of artificial graphite and carbon fabric; a binder in the form of epoxy resin having a molecular weight of 300–1560 obtained through condensation of epichlorohydrin with diphenylolpropane and polyalumophenylsiloxane resin having a molecular weight of 5000–15000 with a mole ratio of the silicon atoms to the aluminium atoms equal to 3–8; chlorinated paraffin having a molecular weight of 500–1100 and chlorine content of 40–70 mole percent; the proportion of said components in said self-lubricating antifriction material being as follows (% by weight):

epoxy resin — 15 – 57
polyalumophenylsiloxane resin — 3 – 10
chlorinated paraffin — 0.2 – 10
carbon filler — the balance 2. A self-lubricating antifriction material according to claim 1 which, when it contains powdery carbon filler, it also contains a dry lubricant selected from the group consisting of powdery boron nitride, powdery natural graphite and powdery molybdenum disulphide; said dry lubricant being included into said antifriction material in an amount of 5–10% by weight.

* * * * *